United States Patent [19]

Branscumb et al.

[11] Patent Number: 5,060,960

[45] Date of Patent: Oct. 29, 1991

[54] COMBINATION WHEELCHAIR AND LIFTING DEVICE

[76] Inventors: Robert D. Branscumb; William C. Ross, both of 1625 E. 75th Ter., Kansas City, Mo. 64131

[21] Appl. No.: 302,383

[22] Filed: Jan. 27, 1989

[51] Int. Cl.[5] ................................ B62M 1/14

[52] U.S. Cl. ................ 280/250.1; 280/304.1; 280/647; 280/657; 280/47.41

[58] Field of Search ............ 280/647, 648, 42, 650, 280/250.1, 304.1, 226.1, 220, 221, 223, 638, 657, 658, 47.41; 297/DIG. 4, 416, 417, 419, 420

[56] References Cited

U.S. PATENT DOCUMENTS

| | | | |
|---|---|---|---|
| 4,405,142 | 9/1983 | Whetstine | 280/250.1 |
| 4,453,732 | 6/1984 | Assanah et al. | 280/648 |
| 4,542,918 | 9/1985 | Singleton | 280/650 |
| 4,555,121 | 11/1985 | Lockard et al. | 280/648 |
| 4,592,562 | 6/1988 | Strautnieks et al. | 280/250.1 |
| 4,676,519 | 6/1987 | Meir | 280/250.1 |

*Primary Examiner*—Andres Kashnikow
*Assistant Examiner*—Richard Camby
*Attorney, Agent, or Firm*—Richard C. Litman

[57] ABSTRACT

A wheelchair includes a seat panel which is adjustable in a vertical direction upon the manipulation of a jacking assembly beneath the seat panel by an attendant or person other than the wheelchair occupant. During this shifting of the seat panel it is guided by engagement of its corners with four vertical frame members of the wheelchair. Armrests and side portions of the chair frame are pivotable to an out of the way position to form an enlarged planar surface area permitting at least partial reclining of the occupant and ready shifting to a lateral surface such as an adjacent bed. The wheelchair is alternatively supported upon four small wheels, at least two of which caster or, upon two small front wheels and two larger diameter drive wheels thereby offering the most efficient manipulation by either the occupant or an attendant.

8 Claims, 2 Drawing Sheets

COMBINATION WHEELCHAIR AND LIFTING DEVICE

FIELD OF THE INVENTION

The field of this invention relates generally to mobile land vehicles and more particularly, to an improved wheelchair and is especially directed toward an improved combination of such wheelchairs and cots. This invention is also directed to an improved vehicle for moving invalid patients between a bed and a wheelchair. A lifting device is included in the wheelchair to facilitate such transporting of patients.

BACKGROUND OF THE INVENTION

Wheelchairs, as a matter of interest to hospitals, patient facilities, and private persons, are a major concern. For the most part, wheelchairs are designed to transport patients from one location to another with a minimum of difficulty. Indeed, most wheelchairs include the capability for allowing the wheelchair occupant to move the chair of his own accord. Predominantly, this is done using human arm and hand power. However, there are those designs that involve motorized driving means.

In cases where a patient is capable of driving their own chair, the difficulties of the hospital or support staff that may be concerned with such propulsion are minimal. Usually, such handicapped persons can manage for themselves and are able to help the attendant in whatever fashion necessary during transfer to and from the wheelchair.

However, there is a much larger concern when medical officials are required to move a patient that is incontinent or has the functional loss of one or more limbs. Such patients often must be moved completely with the help of others as they do not have the capacity of independent motion. In such circumstances, especially in the hospital environment, these patients may require the help of two or more attendants to move the individual from chair to bed or vice versa.

DESCRIPTION OF THE RELATED ART

There have been numerous attempts at providing improved wheelchairs for paraplegic patients. Exemplary patents include U.S. Pat. No. 3,381,973 issued to Carr, U.S. Pat. No. 3,787,089 issued to Wrethander, U.S. Pat. No. 3,968,991 issued to Maclaren, U.S. Pat. No. 4,405,142 issued to Whetshire, U.S. Pat. No. 4,453,732 issued to Assanah et al., and U.S. Pat. No. 4,542,918 issued to Singleton. These patents disclose various features facilitating the transport of wheelchair occupants but fail to suggest the unique combination provided by the instant construction.

SUMMARY OF THE INVENTION

By the present invention, an improved wheelchair is disclosed. With the instant apparatus, the transportation and handling of incontinent and invalid patients is noticeably simplified and will often require the attendance of only one capable person.

Accordingly, one of the objects of the present invention is to provide an improved wheelchair that facilitates the movements of patients from bed to wheelchair and back.

This invention provides for a wheelchair including a hydraulic pump below the patient seat panel. The pump is foot-actuated much in the same way as the traditional barber's chair. In the instance where the patient must be moved from chair to bed, the nurse or attendant is able to raise the chair seat level to that of the bed level. Thus, the attendant is not required to summon help as he or she does not need to physically lift the patient from the chair. The individual may be moved in the seated position to bedside.

Especially useful with this invention is the fact that the wheelchair can be transformed into a temporary bed facility. In this arrangement, the attendant may raise the chair seat to the level of the bed, lay the patient down on the wheelchair cot and proceed to move him/her to the mattress. The combination of the two features of this invention allows for simplicity of movement whereby the attendant can move the patient without aid. This potential will save hospital time, especially when other patients require the attention of attendants and nurses. Presently, these individuals are required to focus their attention on a single patient.

Especially important to this design is the fact that the individual charged with the care of an invalid patient reduces his/her time with the patient in relation to movement. Thus, this person is allowed to attend to the concerns of the patient more fully, and not neglect the patient because of the frustrations associated with the moving of the patient. Such an individual may be a private individual caring for his or her relative who has recently become paralyzed or otherwise dependent upon a wheelchair.

An additional object of this invention is to provide an improved wheelchair including a seat that may be removed from the wheelchair. This is of concern to those individuals charged with the care of incontinent patients. In a hospital situation, the removal of the seat may allow for the replacement with an unsoiled seat and thus make the chair immediately useful for another patient. The second patient need not wait for the chair to be cleaned and serviced.

This feature is of particular importance to those individuals caring for incontinent patients. After returning a patient to their bed, the seat may be removed and cleaned in a separate location. The attendant need not move the entire chair to a location where cleanup is accomplished.

Likewise, the backrest may be removed from the wheelchair frame to permit lowering of a patient's back or to facilitate cleaning and replacement of the chair backrest.

Still another object is to provide an improved wheelchair having alternate wheel assemblies operable to accommodate two primary functions. Small rear wheels may be used when a nursing attendant is pushing the chair. Alternately, the small wheels may be immobilized as larger diameter wheels are installed to accommodate a paraplegic patient.

The small wheels, all of which may caster, offer a great deal of mobility to the person pushing the wheelchair. Such an attendant would not be encumbered with the obvious difficulties offered by the large conventional rear wheels. The use of the smaller wheels allows for a wheelchair of lesser width. This may be particularly important to those persons who are required to move an invalid patient through the hallways of his/her home.

However, the large rear wheels offer an alternate approach to the situation. If the person who uses the chair is a paraplegic, he/she may wish to be independently mobile. The use of the large rear wheels allows the patient to push himself to whatever destination they may have in mind.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the figures of the drawings.

DESCRIPTION OF THE PREFERRED EMBODIMENT

Figure 1:
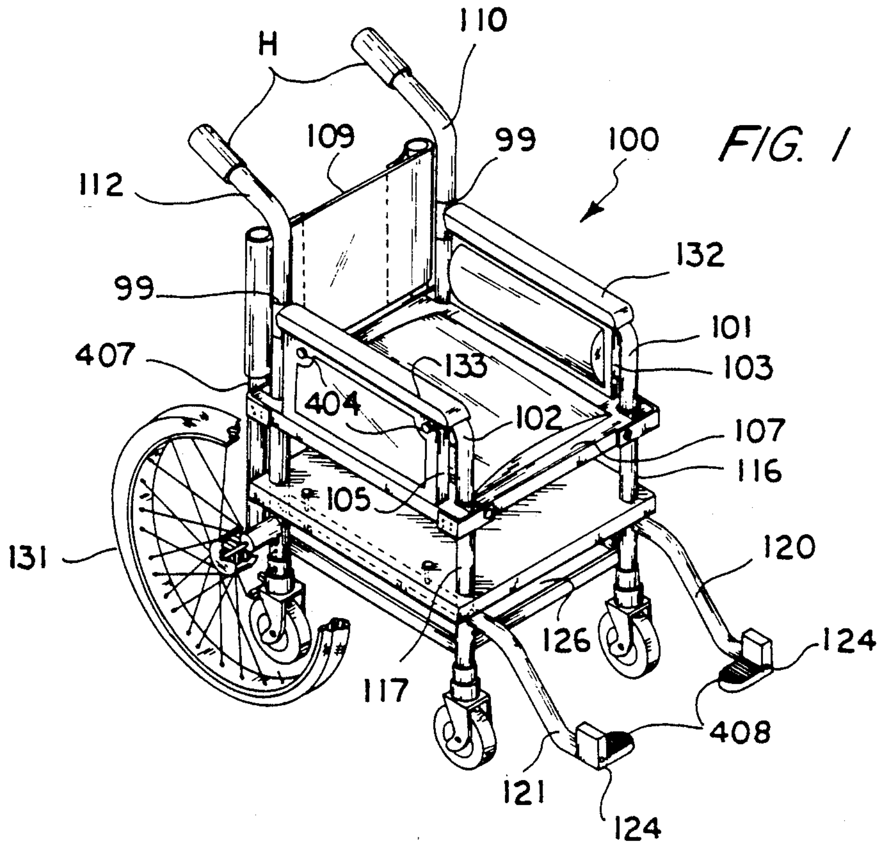
FIG. 1 is a perspective view of the wheelchair device showing the pertinent features of the invention.

The combination wheelchair and lifting device 100 which the subject of this invention is generally illustrated in FIG. 1 by a perspective view.

The basic frame of the combination wheelchair and lifting device 100 comprises, among other things, four upright members including a left front support bar 116, right front support bar H 117, the left rear handle bar H and support 110, and the right rear handle bar H and support 112.

The left front support bar 116 and the right front support bar 117 are provided with topmost holes or other mating means to accept the lower segments of each of the left pivotable armrest 101 and the right pivotable armrest 102. The illustration of this functional arrangement may be found in FIG. 2. Each of these armrests is provided with a padded cushion at their superior portions. These cushions are designated by the left detachable armrest cushion 132 and the right detachable armrest cushion 133.

Figure 2:
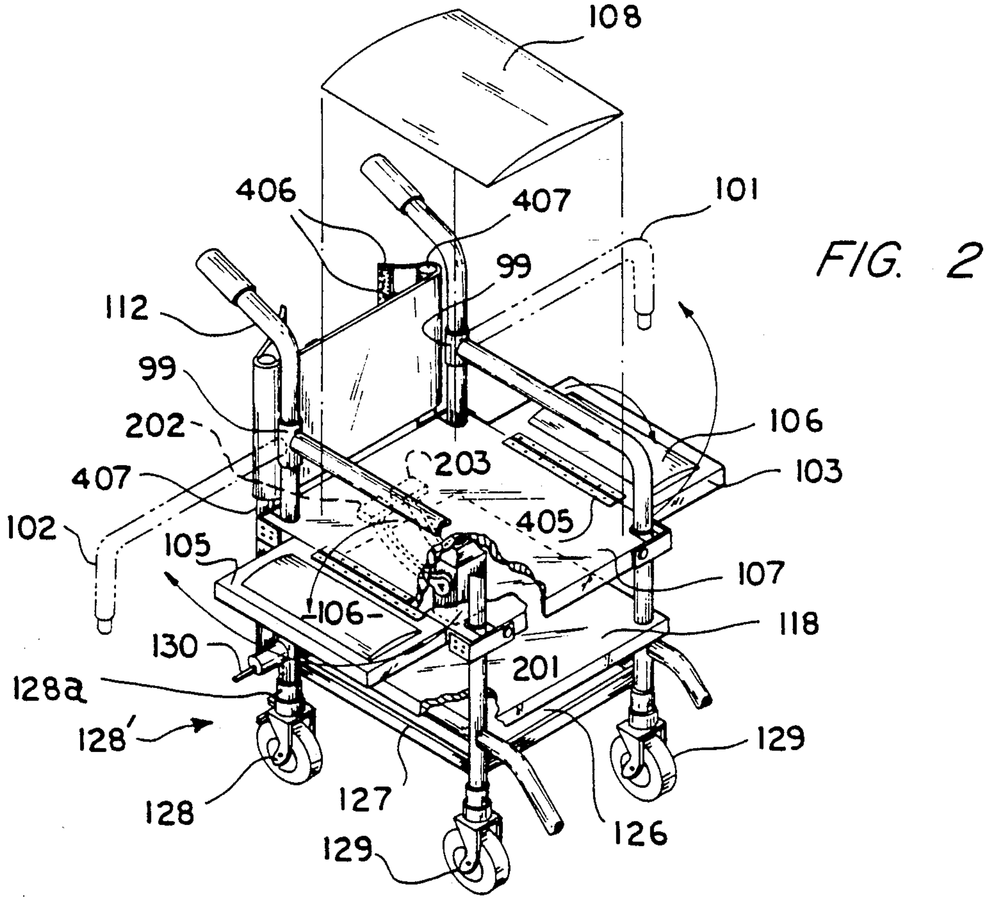
FIG. 2 is a view similar to FIG. 1 and illustrates the displacement of various components into alternate positions.

Each of these armrests is connected to its respective rear support bar 110, 112 by displaceable means such as the cylindrical collars 99. These collars simply are fitted loosely over the rear support bars 110, 112 such that the armrests 101, 102 may be lifted from their connection to the front support bars 116 and 117, and moved arcuately to the side. Again, FIG. 2 is a helpful illustration of this function.

Below each of the pivotable armrests 101 and 102 is a movable panel arrangement. On the left, the arrangement is designated by the left side panel 103. On the right, the corresponding part is the right side panel 105. Each of these side panels 103 and 105 is fitted with a cushion 106 for the comfort of the individual using the wheelchair. Both cushions 106, 106 will be seen to face one another when the side panels 103 and 105 are elevated, as in FIG. 1.

The seat portion of the wheelchair can be divided into two separate parts. The main body of the seat is the detachable seat panel 107 of rectangular configuration. Located atop seat panel 107 is a seat panel cushion 108. The seat panel cushion 108 is designed such that the patient is afforded the maximum comfort while in the wheelchair and may be releasably attached to the seat panel by any suitable means such as Velcro or the like.

Figure 3:
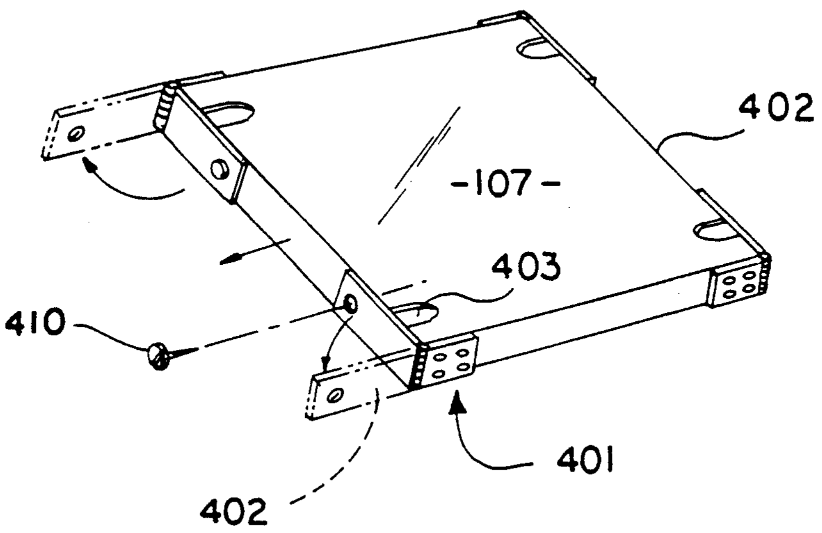
FIG. 3 is an enlarged perspective view of the seat panel.

Associated with the detachable seat panel 107 are two additional features of the present invention, one of which is also associated with the side panels 103 and 105. At the four corners of the detachable seat panel 107 there are attached hinge assemblies 401 shown most clearly in FIG. 3.

One of the hinge assemblies 401 is permanently fixed to the vertical edge of the detachable seat panel 107 at each one of the panel corners and includes a pivotal gate 402 adapted to overlie a notch or opening 403 adjacent each corner of the seat panel 107. A hand-tightened screw 410 is threaded into the body of the detachable seat panel 107 by the user to thusly captively position the seat panel relative to the four vertical portions of the supports 110, 112, 116 and 117. The clearance between the frame supports and the openings 403 in the seal panel will be understood to be minimal such that the seat panel is substantially stable in a horizontal plane.

The side panels 103 and 105 are provided with suitable releasable fasteners 404 operable to hold the side panels 103 and 105 upright as in FIG. 1, and which are operable when the attendant wishes to move the side panels 103 and 105 to the horizontal position to transform the wheelchair to a cot/stretcher arrangement as shown in FIG. 2. Appropriate hinge means 405 is selected to accommodate the above-described displacement and retention of the side panels in the two alternate positions.

At the rear of the wheelchair, spanning the rear supports 110, 112, will be seen a detachable, flexible backrest 109 having mating fasteners such as Velcro strips 406 appropriately located so that the ends of the backrest 109 may be quickly attached to, removed from or adjustably secured around the right and left handlebars 110, 112 or, about supplemental support bars 407 as shown in FIGS. 1 and 2.

Up to this point, the discussion of the preferred embodiment has revolved around the features above the detachable seat panel 107. Now will be described the features of the present invention that are arranged below the seat panel.

The front and rear support bars 110, 112, 116, 117 are joined by a planar support member 118 which will be seen to serve to reinforce the entire wheelchair structure so that it functions in a more stable manner.

In addition to the rectangular planar support member 118, a cargo tray of rectangular configuration 126 is disposed therebeneath and obviously will further strengthen the wheelchair structure. The tray 126 includes four upstanding sidewalls 127 serving to keep any cargo located on the tray from rolling off when the wheelchair is in motion. Obviously, the panel sidewalls 127 likewise serve to strengthen the wheelchair structure.

Mounted upon the medial portion of the planar support member 118 is a lift assembly 201. This assembly functions to raise and lower the seat panel 107 upon the activation of a respective one of the two rearwardly-extending foot pedals 202, 203, one of which controls the raising while the other controls the lowering of the seat panel 107. The lift assembly 201 may comprise a hydraulic pump or any other suitable jacking mechanism. Raising and lowering of the seat panel 107 is done to facilitate movement of the patient from the wheelchair 100 to his/her bed and vice versa.

Extending from the front support bars 116 and 117 are the right footrest arm 121 and the left footrest arm 120 and which terminate with any well-known type of foot platform 408. Each footrest arm will be seen to project rearwardly to join the two frame members 117, 112 and 110, 116 respectively, thereby further strengthening the vehicle framework.

The left and right footrest pedal platforms 408 are hingedly connected as at 124 to allow for the arcuate movement of the footrest platforms from the horizontal to the vertical position, as is well-known. This particular arrangement is helpful when moving the patient, as the feet of the patient may be placed on the floor. This prevents the patient's weight from pushing the wheelchair in a rearward direction when lifted from the chair.

At the bottom of each of the four support bars, 116, 117 and 110, 112 there are provided front and rear caster assemblies 129 and 128, respectively. This will permit the maximum manipulation of the wheelchair 100, even within its own wheel base, when being handled by an attendant through grasping of the handgrips H, H.

Adjacent the bottommost portion of the frame rear support bars 110, are two outwardly-projecting stub axles 130 adapted to removably support the large diameter occupant-propelled drive wheels 131. To utilize the drive wheels 131, the rear caster wheel assemblies 128 are elevated by manipulation of suitable adjustable catch and attachment means 128' whereby the weight of the rear of the vehicle will be supported by the drive wheels 131. The catch means may include a removable pin 128*a* selectively insertable through openings in the frame members 112 to position and retain the rear wheel assemblies 128 at the desired elevation.

The ability to adjust the height of the vehicle rear not only immobilizes the caster wheel assemblies when desired but also facilitates the removal and replacement of the large drive wheels 131 since the smaller wheels when lowered, in effect, provide a jack to allow removal of the large wheels without having to hold up the back of the vehicle.

From the above it will be appreciated that ready means have been provided to allow for the maximum manipulation of a wheelchair, either by the patient or an attendant and wherein when necessary, a single attendant may convert the vehicle to allow lateral displacement of the patient in a plane coincident with that of the adjacent, disparate surface.

It is understood that the present invention is not limited to the sole embodiment described above but encompasses any and all embodiments within the scope of the following claims.

I claim:

1. A wheelchair for facilitating the transfer of a patient to and from a bed comprising:

a framework assembly including a pair of vertical front support bars having respective upper ends provided with a pair of mating means and lower ends provided with a set of castor wheels, a pair of vertical rear support bars having respective upper ends provided with a pair of handle bars and lower ends provided with a set of castor wheels, and a rectangular support member having a horizontally disposed upper planar surface which is fixedly connected at the corners to both pairs of the vertical support bars adjacent the respective lower ends;

a seat panel of rectangular configuration which is horizontally disposed above said rectangular support member, said seat panel having openings at each corner thereof for slidingly engaging both pairs of said vertical support bars and being hingedly joined to an opposing pair of side panels which is displaceable from a vertical position to a horizontal position;

hydraulic lifting means disposed between said rectangular support member and said seat panel for vertical adjustment of the seat panel; and a pair of pivotable armrests having respective front end sections provided with cooperating mating means for engaging said pair of mating means on the vertical front support bars when in a parallel position and respective rear end sections provided with displaceable attachment means for slidingly engaging said pair of vertical rear support bars, said pair of pivotable armrests being displaceable from said parallel position to a position laterally clear of said seat panel.

2. The wheelchair according to claim 1 including a storage tray of rectangular configuration fixedly arranged beneath said rectangular support member.

3. The wheelchair according to claim 1 including cushions attached to said seat panel and interior surfaces of said opposing pair of side panels.

4. The wheelchair according to claim 1 wherein said hydraulic lifting means includes a pair of pedals which extend rearward for foot actuation in raising and lowering said seat panel.

5. The wheelchair according to claim 1 wherein both set of castor wheels are of relatively small diameter.

6. The wheelchair according to claim 1 including a set of removable rear drive wheels of relatively large diameter.

7. The wheelchair according to claim 1 including a removable seat back substantially spanning an area between said pair of vertical rear support bars.

8. The wheelchair according to claim 1 including releasable fastening means adjacent each corner opening of said seat panel to provide for removal of the seat panel.

* * * * *